United States Patent [19]

Knothe et al.

[11] Patent Number: 4,597,458
[45] Date of Patent: Jul. 1, 1986

[54] ELECTRIC BALANCE WITH ADJUSTABLE RELATIVE PRECISION

[75] Inventors: Erich Knothe, Bovenden; Franz-Josef Melcher, Hardegsen; Christian Oldendorf, Göttingen, all of Fed. Rep. of Germany

[73] Assignee: Sartorius GmbH, Göttingen, Fed. Rep. of Germany

[21] Appl. No.: 663,568

[22] Filed: Oct. 22, 1984

[30] Foreign Application Priority Data

Nov. 9, 1983 [DE] Fed. Rep. of Germany ....... 3340421

[51] Int. Cl.$^4$ .................. G01G 23/14; G01G 9/00; G01G 7/00; G01G 21/08
[52] U.S. Cl. ..................................... 177/164; 177/1; 177/212; 177/260
[58] Field of Search ............... 177/164, 165, 175, 176, 177/185, 212, 260, 1, 25

[56] References Cited

U.S. PATENT DOCUMENTS

| 2,477,774 | 8/1949 | Staples | 177/175 X |
| 3,081,834 | 3/1963 | Braun | 177/176 |
| 3,709,309 | 1/1973 | Williams, Jr. et al. | 177/165 |
| 3,986,571 | 10/1976 | Strobel et al. | 177/185 |
| 4,039,036 | 8/1977 | Baumgartner et al. | 177/185 X |

Primary Examiner—E. A. Goldberg
Assistant Examiner—Patrick Foster
Attorney, Agent, or Firm—Eric P. Schellin

[57] ABSTRACT

A balance having a setting means with which the relative precision of the weighing result is to be determined can be set by the user. The balance then adapts automatically to the set relative precision. This adaptation can occur, e.g., in the number of positions displayed, in the step width in the last particular position, in the selection of the integration time, in the filtering of the measured values in the digital signal processing unit, in the frequency of the taking over of the measured value into the display and/or at the time of the emission of the standstill signal or of the measured value release signal.

9 Claims, 3 Drawing Figures

ELECTRIC BALANCE WITH ADJUSTABLE RELATIVE PRECISION

BACKGROUND OF THE INVENTION

1. Field of the Invention:

The invention is related to an electric balance having a measured value receiver, a digital signal processing unit and a digital display for the weighing results.

2. Description of the Prior Art:

Balances of the above described type are generally known. In order to adapt balances to various requirements of precision on the part of the users, it is known that they can be equipped, for example, with two weighing ranges. The two weighing ranges differ from one another in their maximum load and in the smallest weight unit resolved, by a factor of 10. Balances are also known in which the smallest weight unit resolved can be varied by one position by varying the integration time.

These known possibilities of adaptation are very approximate and limited and are also linked to the maximum load in two-range balances. In addition, they usually require a manual shift. For this reason many weighings are performed with inappropriate and too-high precision, which unnecessarily prolongs the weighing time.

SUMMARY

The invention has the goal of improving a balance of the type indicated above in such a manner that it can be better adapted to various requirements of precision.

The invention achieves this goal by providing adjusting means with which the relative precision with which the weighing result is to be determined can be set by the user.

The user of the balance simply sets the desired relative weighing precision and the balanced adapts itself automatically. This adaptation can occur, in the number of positions displayed, in the step width, in the last particular position, in the selection of the integration time, in the filtering of the measured values in the signal processing unit, in the frequency of the taking over of the measured value into the display and/or at the time of the emission of the standstill signal or of the measured value release signal.

BRIEF DESCRIPTION OF THE DRAWINGS

The invention is described in the following using the example of a balance with a measured value receiver in accordance with the electromagnetic compensation of force.

DETAILED DESCRIPTION

Figure 1:
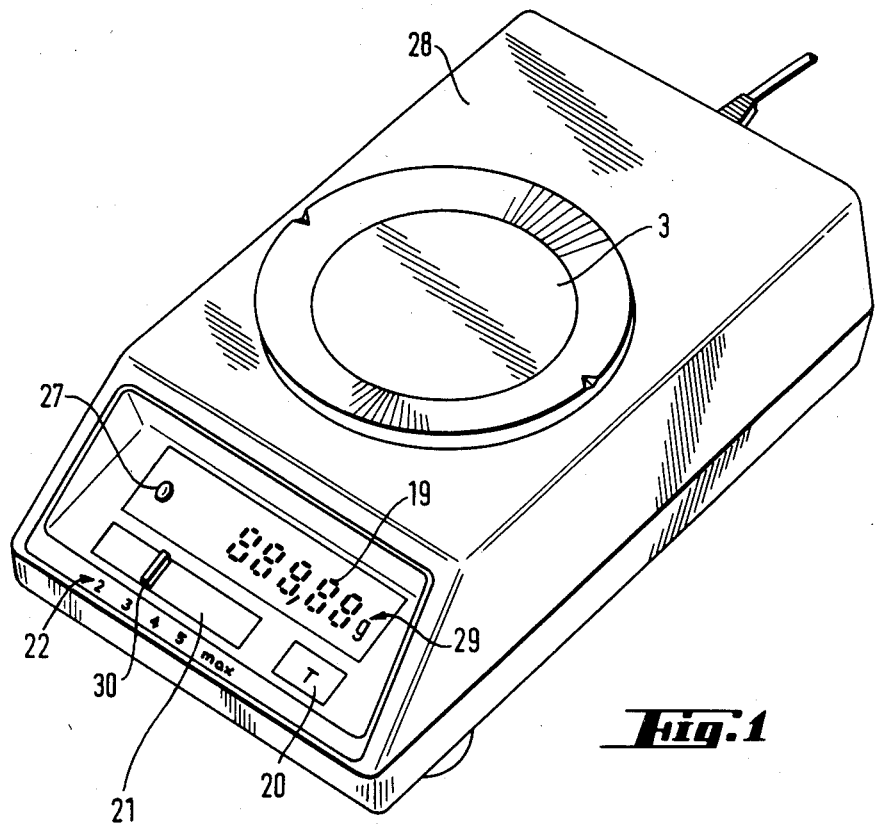
FIG. 1 shows a perspective view of the balance.

The electric balance in FIG. 1 comprises housing 28, balance scale 3 for receiving the material to be weighed, and display 19 for displaying the weighing result. Tare key 20 is provided for taring the balance. In addition, slider switch 21 is provided with numbered scale 22 whereby the relative precision with which the weighing result is to be determined can be set by sliding toggle 30.

Figure 2:
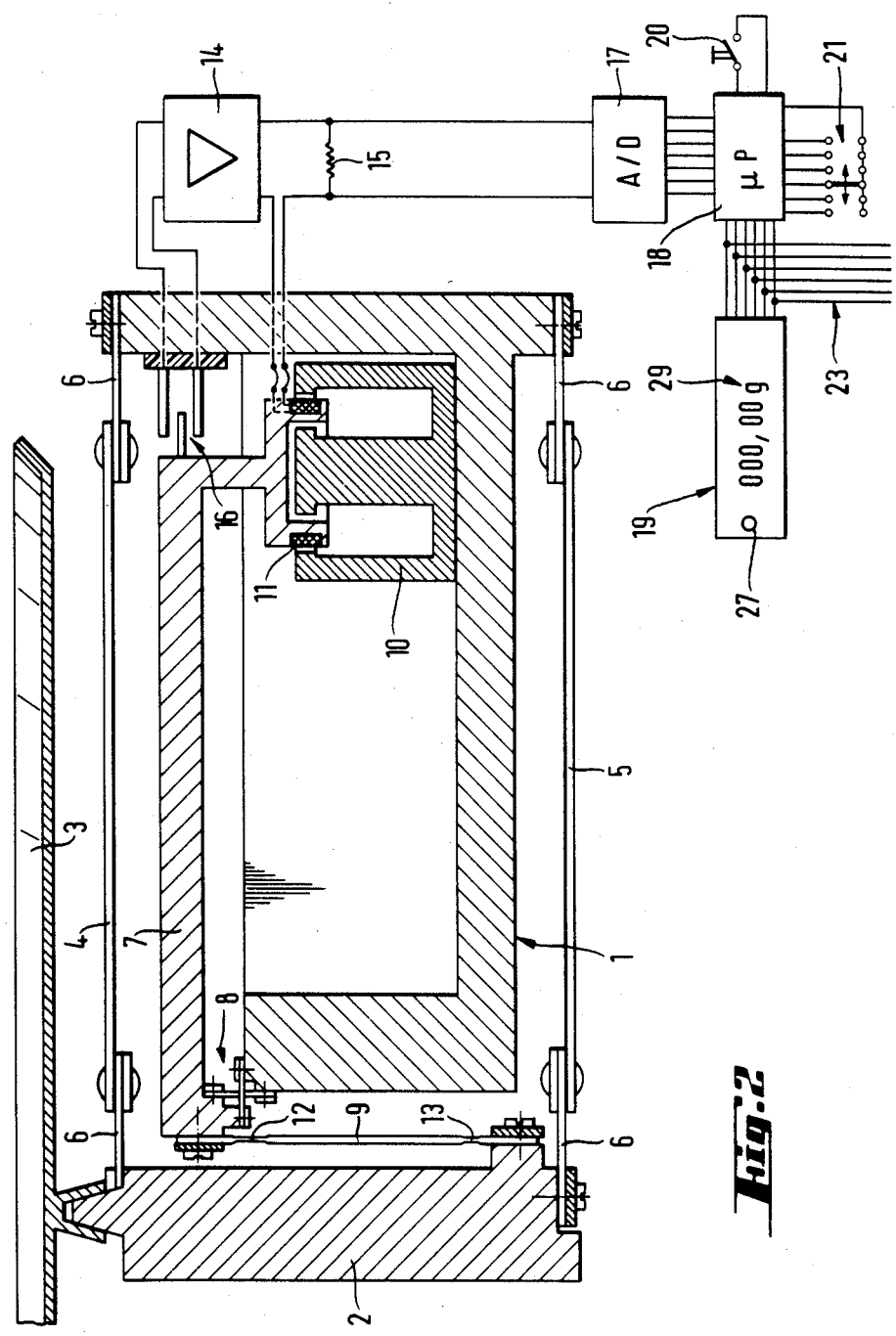
FIG. 2 shows a section through the measured value receiver a block circuit diagram of the electronic components.

FIG. 2 illustrates the method of operation of this electric balance. This figure shows support member 1 which is fastened to the housing (not shown). Load receiver 2 is attached in a vertically moveable fashion to support member 1 via two rods 4 and 5 with articulated joints 6. Load receiver 2 carries load scale 3 in its upper part for receiving the material to be weighed and transfers the force corresponding to the mass of the material to be weighed over coupling element 9 with thin areas 12 and 13 to the shorter lever arm of transfer lever 7. Transfer lever 7 is mounted by means of cross spring joint 8 to support part 1. The compensation force produced by current-carrying coil 11 in the air gap of permanent magnet system 10 attracts the longer lever arm of transfer lever 7. The magnitude of the compensation current is regulated in a known manner by position sensor 16 and controlled-gain amplifier 14 so that equilibrium prevails between the weight of the material to be weighed and the electromagnetic compensation of force. The compensation current produces a measuring voltage on precision resistor 15 which is fed to digitizer 17. The digitized result is taken over by digital signal processing unit 18, e.g. a microprocessor, and digitally displayed in display 19.

In addition, tare key 20 and slider switch 21 for setting the desired relative precision of the weighing result are provided. Tare key 20 and slider switch 21 are directly connected to digital signal processing unit 18 in which the digital weighing data coming from digitizer 17 is appropriately processed. If, for example, a high relative precision is set by means of slider switch 21, digital signal processing unit 18 selects a filter algorithm which assures a high degree of suppression of interference (and therefor reacts correspondingly slowly to a change of load). The processing unit adapts the frequency with which measured values are written into display 19 to this filter algorithm and it compares successive measured values for equality in a known manner. During this comparison the digital signal processing unit also considers the precision desired by the setting of slider switch 21: If the net load, i.e. the load change on the balance scale since the last taring, is 150 g and if a relative precision of $10^{-5}$ is set, then successive measured values can differ from each other by 1.5 mg at the most in order that the digital signal processing unit emits the standstill signal. This standstill signal allows symbol "g", for example, to light up in the display and simultaneously frees the digital weighing data at the data output (leads 23). Digital signal processing unit can likewise adapt the number of the positions appearing in display 19 and/or the step width in the last particular position to the set relative precision and to the current net load.

If a low precision of e.g. $10^{-2}$ is set for another application, digital signal processing unit 18 selects a much more rapid filter algorithm, feeds a new measured value more frequently into display 19 and reduces the number of positions displayed. During checking for standstill the standstill signal and the measured value release signal can be emitted at a correspondingly greater deviation between successive measured values, so that this (more inexact) weighing requires only a much shorter time.

For most weighing tasks it makes more sense to set for relative precision than to set for absolute precision. If, for example, a mixture is to be produced in accordance with a set mixing proportion, it is sufficient if the heavier components are determined with the same relative precision as the light components. If, for example, a mixture is to be produed on a balance with 1 kg maximum load and 1 mg resolution for which a maximum deviation from the theoretical mixing proportion of $10^{-3}$ is permitted. The heaviest component could be 500 g and the lightest component 1 g, then, when an absolute weighing precision is set, it must conform to the lightest component of 1 g and thus be 1 mg. All components must then be precisely determined to 1 mg, which takes a correspondingly long time. However, when the relative precision of $10^{-3}$ is set, the balance determines only this lightest component precisely to 1 mg, while, the heaviest component with its 500 g is precisely determined only to 0.5 g, which results in considerably shorter weighing times.

If, in the example of the production of a mixture, taring is performed after the weighing of a heavy component in order to subsequently weigh another, possibly lighter component, the taring process must of course be precisely performed again at the full number of digits of the balance in order to also be able subsequently to determine a light component with the required relative precision. However, this causes practically no loss of time, since the change to the second component after the end of the first weighing requires a certain amount of time anyway.

Figure 3:
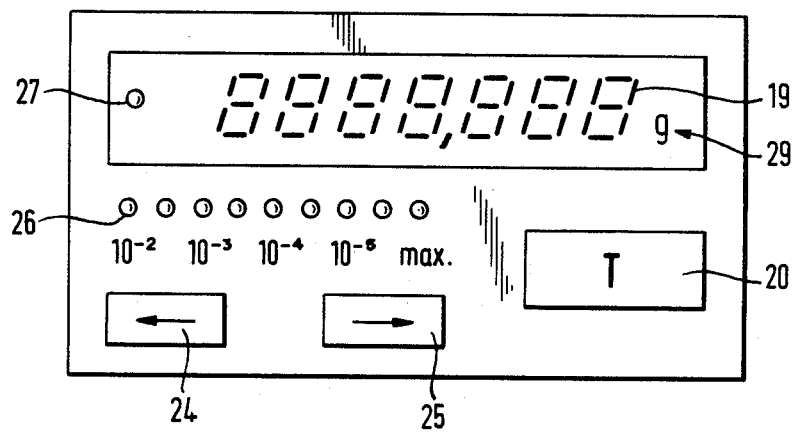
FIG. 3 shows the display and control panel of the balance in a second embodiment.

FIG. 3 shows another embodiment of the display and control panel. Keys 24 and 25 are provided for setting the desired relative precision, which can be increased or decreased by means of these keys. The relative precision set is made optically visible by the illumination of one of luminous diodes like in FIG. 3.

It is of course also possible that the relative precision is set over one of data lines 23 (FIG. 2) from an overriding electronic data-processing system. In this instance the set relative precision is also displayed to the operating person with advantage by luminous diodes like in FIG. 3.

We claim:

1. Electric balance having a measured value receiver, a digital signal processing unit and a digital display for displaying the weighing results, characterized in that setting means (21, 24, 25) are provided with which the relative precision, wherein the weight of an article being weighed controls the precision with which the weighing result is to be determined, can be set by the user.

2. Electric balance according to claim 1, characterized in that display means (21, 22, 26) are provided to make the relative precision set by the user on the setting means optically visible.

3. Electric balance according to claim 2, characterized in that luminous diodes (26) are provided as display means.

4. Electric balance according to claim 2, characterized in that a slider switch (21) is provided as setting and display means.

5. Electric balance according to either claim 1, 2 or 3 characterized in that two keys (24, 25) are provided as setting means by which the relative precision can be increased or decreased.

6. Electric balance according to either claim 1, 2 or 3, characterized in that a keyboard is provided as setting means by which the relative precision is set.

7. Electric balance according to either claims 1, 2, 3 or 4 characterized in that various filter algorithm are used in the digital signal processing unit (18) in accordance with the precision set by the setting means.

8. Electric balance according to either claim 1, 2, 3, or 4, characterized in that after load change a standstill signal is emitted by the balance when the set relative precision is reached.

9. Electric balance according to either claim 1, 2, 3 or 4 characterized in that a signal light (27) is provided which lights up if the load on the balance is less than a minimum load resulting from the set relative precision and a smallest resolvable weight unit.

* * * * *